March 17, 1936.  J. M. JACKSON  2,033,987
APPARATUS FOR THE RECLAMATION OF OIL FROM HYDROCARBON OIL EMULSION
Filed May 14, 1934  2 Sheets-Sheet 1
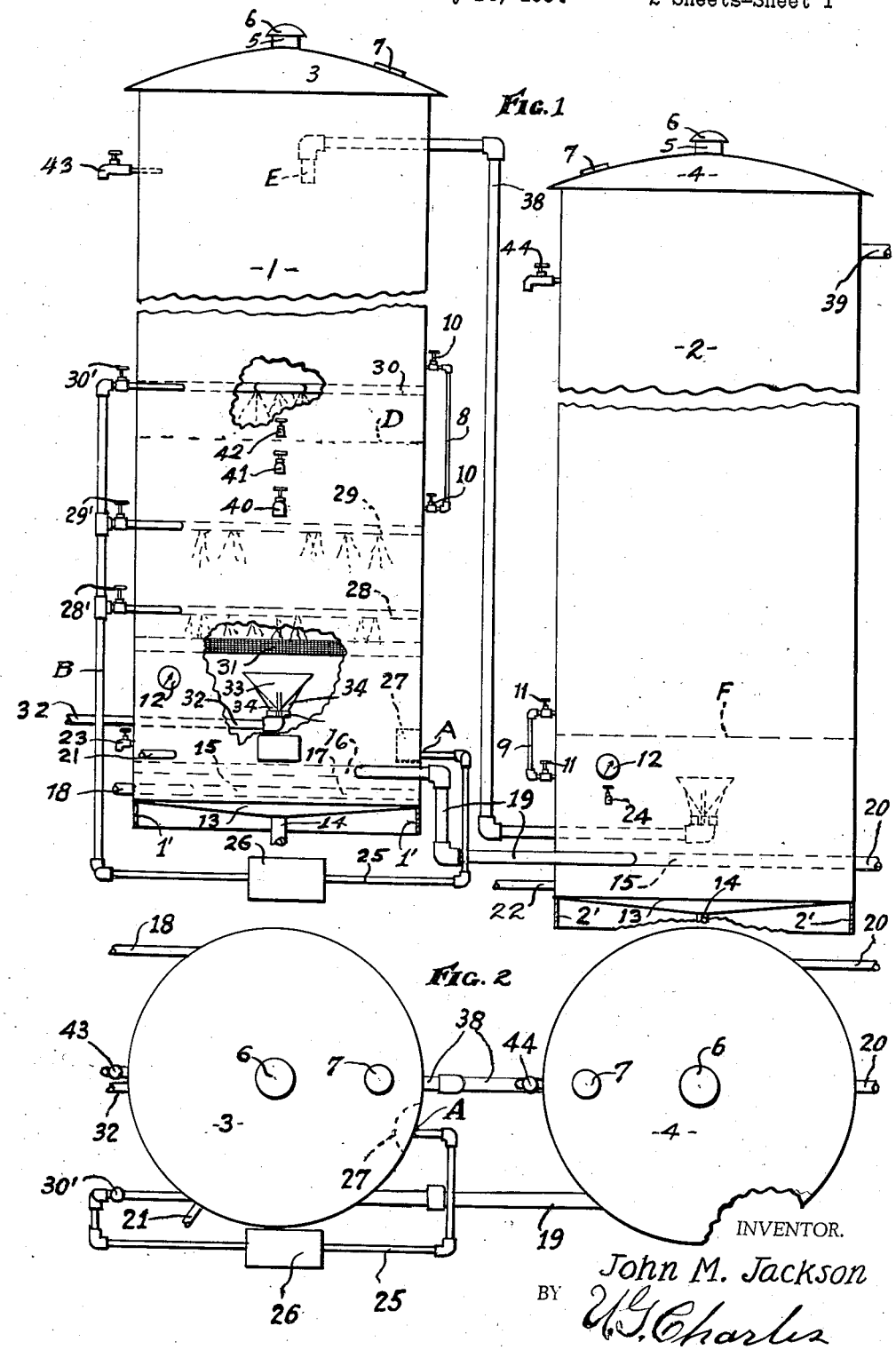
INVENTOR.
John M. Jackson
BY
ATTORNEY.

March 17, 1936. J. M. JACKSON 2,033,987
APPARATUS FOR THE RECLAMATION OF OIL FROM HYDROCARBON OIL EMULSION
Filed May 14, 1934 2 Sheets-Sheet 2
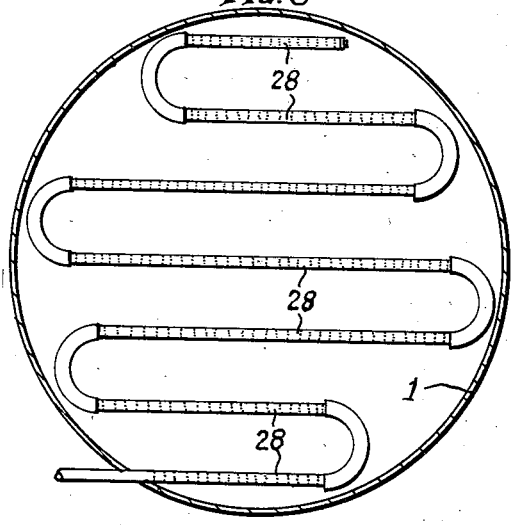
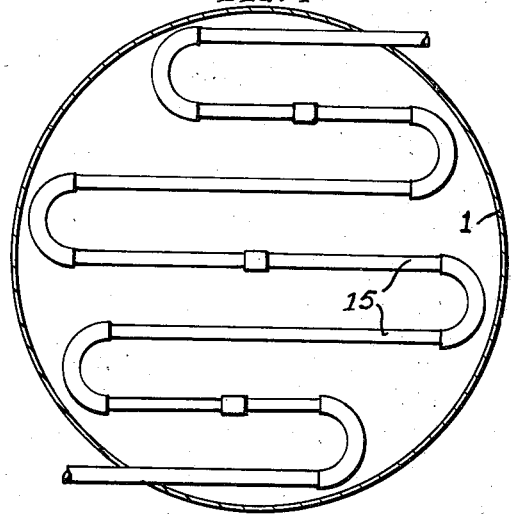
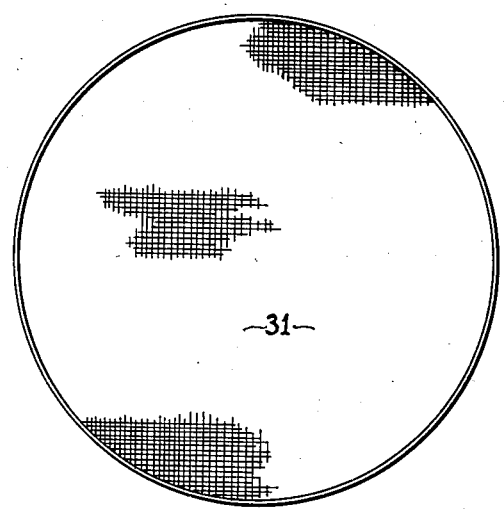
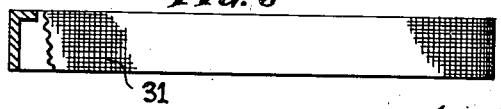
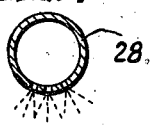
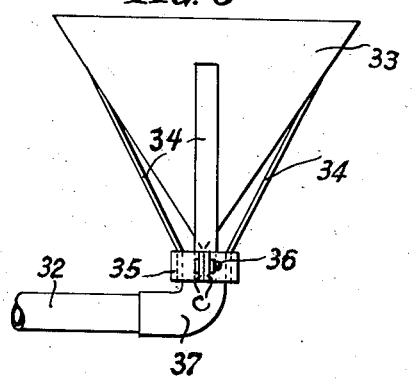
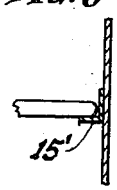
INVENTOR.
John M. Jackson
BY
ATTORNEY.

UNITED STATES PATENT OFFICE 2,033,987

APPARATUS FOR THE RECLAMATION OF OIL FROM HYDROCARBON OIL EMULSION

John M. Jackson, Wellington, Kans., assignor to Crude Oil Recovery Company, Wichita, Kans., a corporation of Kansas Application May 14, 1934, Serial No. 725,554

2 Claims. (Cl. 210—48)

My invention relates to the process of, and an apparatus for the reclamation of oil from hydrocarbon emulsion.

The object of my invention is to process the basic sediment known as hydrocarbon emulsion by the introduction of any appropriate chemical as an agent for the separation of oil from the sediment, through the medium of an apparatus and under the process of continuous operation herein disclosed.

A further object of my invention is to provide in the apparatus, heating arrangements and method of manipulating hydrocarbon emulsion to uniformly spread the same and separate the accumulation of mass, causing it to pass through a system of baffles in contact with a spray thereby breaking down the emulsion and bringing about the disassociation of the oil, water and sludge, at which time the foreign substance will settle simultaneously with the rising of the oil passing through a chemical fluid.

A still further object of my invention is to process an unmarketable substance, recovering therefrom a marketable grade of hydrocarbon oil; in other words the process herein disclosed provides a method of thoroughly processing the hydrocarbon emulsion to the extent that the sediment accumulation therein, regardless of its nature, will separate from the oil under the process of treatment herein disclosed assisted by the apparatus.

These and other objects will be hereinafter more fully explained, reference being had to the accompanying drawings and in which like characters will apply to like parts in the different views, referring to the drawings.

Fig. 1 is a side view or elevation of the tanks, parts removed for convenience of illustration.

Fig. 2 is a top or plan view of the tanks.

Fig. 3 is an enlarged, inverted plan view of the spray coil, the tank being shown in cross section.

Fig. 4 is a plan view of the heating coil with the tank shown in cross section.

Fig. 5 is a plan view of the baffle.

Fig. 6 is a side view.

Fig. 7 is an enlarged cross section through one of the spray coils.

Fig. 8 is a side view of the conical deflector and portion of the pipe carrying the same.

Fig. 9 is a side view of one of the bracket supports for the coils and sectional view of the tank wall supporting the same.

The invention, with respect to the apparatus, herein disclosed consists of a tank 1, and a tank 2, the latter being placed on a lower plane than the other said tank, each tank vertically supported by a foundation sufficient to support the same securely, the foundation not shown in the drawings, but will contact the flange portion 1' and 2' respectively of each tank that is sectionally shown.

Each of the said tanks has a removable top covering 3 and 4 respectively, the said tops are equipped with a vent comprising a neck 5 and a cap 6 secured thereon but loosely engaging to accommodate for the expansion and contraction, the said vents are axially positioned with respect to the tanks; there is also arranged observation ports having lids 7, each of which is eccentrically positioned, by which means contents of the tanks may be observed to ascertain the approximate depth of oil or other liquid contained therein.

There is also placed on the side of tank 1 a tubular glass gauge 8, to indicate the depth or quantity of the chemical liquid, the purpose of which is later described, and on tank 2 spaced from the bottom thereof is a like gauge 9 for a similar purpose to that of gauge 8, each of said gauges has valves 10 and 11 to seal their respective nipple connections between their tanks and tubes, should the said tubes become broken, or to cleanse the same.

Positioned near the bottom of each tank is a thermo gauge 12 registering the temperature of the contents of said tank. Each of said tanks has a concavo-convex bottom 13 provided with a drain pipe 14 at the apex thereof, the said pipes extending to a place of disposal for sediment accumulation, and the said pipes are equipped with gate valves or their equivalent, the latter not being shown in the drawings.

Positioned in close proximity to the bottom of tank 2 is a steam coil 15 and a pair of similar coils 16 and 17 in tank 1, the last said coils are positioned transverse to each other with respect to their straight pipe portions, all of said coils being connected for communication and through which steam circulates. The lower coil 17 has a pipe 18 connected therewith and extending to a suitable boiler as steam supply for the coils, the boiler not shown in the drawings. Coils 15 and 16 are connected by pipe line 19. There is also provided an exhaust pipe 20 as a return to the boiler for circulation of the steam.

The purpose of the heating arrangement is to maintain the desired temperature of the fluid contained in each tank.

Tank 1 is provided with a supply pipe 21 connecting the said tank with a chemical tank positioned as desired, but not shown in the drawings, the said chemical is conveyed to tank 2 through the medium of a supply pipe 22 having its connection with the said tank, each of the said supply pipes is equipped with a check valve, in close proximity to the said chemical supply tank, or the said chemical may be conveyed from tank 1 to tank 2; in case of the latter arrangement a check valve will be required in the pipe line to control the quantity desired in tank 2.

To test the chemical contained in each tank, I have arranged faucets 23 and 24, spaced a short distance from the bottom of the respective tanks by which means a quantity of the said chemicals may be withdrawn for testing purposes, as the same becomes deteriorated by constant use, in which event it may be withdrawn and replaced by a new supply.

A circulating means of the said chemical is provided in tank 1 through the medium of a pipe line 25, having a circulating pump 26 intermedially positioned in the horizontally disposed pipe as shown in Figure 1, said pipe extending upward a short distance connecting with the said tank near the bottom thereof as at A at which point a hood 27 as shown by dotted lines is arranged about the opening of the said pipe connection, the hood being an enclosure secured to the inside wall of the tank with the bottom portion open for fluid to rise therein by which means sediment will not enter the pipe readily. At the other end of the horizontal pipe 25 is a riser B extending upward exterior of the tank to which is connected and spaced apart spraying coils 28, 29 and 30 within the tank as shown by the dotted lines and through parts broken away; each spray coil is controlled by check valves 28', 29' and 30', the purpose of which is later described, the said baffle, steam and spray coils are supported by brackets 15' placed at appropriate points and secured to the tank walls respectively.

It will now be understood that the said tank 1 is the treating tank for said emulsion, while tank 2 is the settling tank for oil rising from the emulsion during the process of treatment which is as follows.

In each of said tanks is a quantity of chemically treated water, herein known as the chemical, the purpose of which is to assist in dissolving the emulsion and bringing this about through disassociation of oil, water and sludge. This I accomplish by a circulating system in the treating tank, having spray coils positioned therein and spaced apart as formerly described, and in addition to that I have positioned a baffle structure 31 beneath the spray coil 28, against which the emulsion will contact on the under side thereof, in its ascent.

The said emulsion is conveyed into the tank by force, from a place of storage through the medium of a pipe 32 having a deflector 33 axially positioned in the tank, the said deflector consists of a conical body supported by legs 34, secured thereto at one end, while the other ends are attached to a collar 35 having the ends thereof turned outward as at C and tensioned together by a bolt 36, by which means the apex of the said conical deflector is in axial alignment with the upturned open portion of a fitting 37 that threadedly engages on the inner end of the said pipe 32. Note that the emulsion, varying in consistency from a liquid to a paste, when conveyed through the said pipe, will be divided in its contact with the apex spreading about the periphery of baffle as it ascends buoyantly, and being thus distributed is means to spread the volume uniformly in contact with the under side of the baffle structure 31, said structure also temporarily retarding the emulsion in its upward movement, together with the force of the chemical as sprayed by its respective coil 28, the said coil being uniformly apertured throughout the length of its members as shown in Figs. 3 and 7.

It will now be understood that the emulsion is dissolved by the chemical heated to a desired degree of temperature and thoroughly broken up while passing through the baffle 31, separating the oil from the sediment, the latter being free to settle in the bottom of the tank while the oil in its ascent comes in contact with the said second similar spray 29 and on third and final spray 30, preparatory to being withdrawn for final treatment in tank 2, the quantity contained is deposited in the upper part of said tank above the chemical the depth of which is indicated by dotted line D and free to flow therefrom through pipe 38 entering the tank near the top thereof and having on the inner end a nipple E turned downward at which point the oil will enter as it flows through the said pipe that extends downward connecting with tank 2 near the bottom thereof, and radially extending therein to the axis and having a similar conical deflector as previously described, the purpose of which is to deflect the oil in its upward movement through a like chemical previously described, the approximate depth of which is indicated by dotted line F by which means the oil has a final saturation or cleansing as it passes through the said chemical, any sediment contained therein will settle to the bottom of the tank and may be removed from time to time, and in this action, the sprays are not required, consequently the oil from the emulsion as treated is a relative high-grade of hydrocarbon oil, and being drained to place of storage through a pipe 39 positioned near the top of the tank, the flow of which is continuous during the process of treatment.

Referring again to tank 1 a faucet 40 is positioned above the spray coil 29 at which point there is a deposit of sludge (as referred to in the oil field practice) and to avoid excess deposit thereof, it is withdrawn by opening the said faucet. There is also placed in vertical alignment with the said faucet, two other faucets 41 and 42 which when opened is a test to determine the proper removal of the sludge. I have also arranged near the top of each tank a faucet 43 and 44 respectively as means to withdraw a quantity of the oil for testing purposes as the process continues.

While I have shown certain arrangements for the heating and spray coils I do not wish to be confined to such alone, as other forms may be adopted resulting in the same function, and the baffle element may be varied using other substance or arrangement to break up the emulsion mass, while passing therethrough, the result of which will be the same, and the conical deflector illustrated and described may be arranged rectangular or otherwise with respect to cross-section, and such other modifications may be employed as lie within the scope of the appended claims.

Having fully described my invention, what I claim as new and desire to secure by Letters Patent, is:

1. In an apparatus for the reclamation of oil from hydro-carbon emulsion of the class described, a tank as a container for oil and liquid and a pipe connected to the lower end thereof, the pipe extending upward along the exterior of the tank and having a circulating pump connected thereto, a second pipe entering the tank and spaced a short distance from the bottom thereof functioning as a conductor for hydro-carbon emulsion into the said tank, discharging the same near the diametrical axis of the tank, the said pipe having an upturned fitting on the inner end thereof, a conical element and means to carry the same on the fitting with the apex of the cone in axial alignment with the upturned opening of the fitting, as spreading means for emulsion discharged from the pipe, a strainer positioned in the tank in close proximity to the conical element, the periphery of the strainer snugly engaging with the inside wall of the tank to check the upward trend of the emulsion, a spray coil positioned in close proximity above the strainer and other similar coils spaced upwardly apart, the said coils connecting with the first said pipe and a valve for each coil to control the flow of liquid therethrough respectively, a second similar tank and a pipe connecting near the top of the first sa'd tank and near the bottom of the last said tank, the latter connection extending inward to the diametrical axis and having a similar fitting and conical element connected thereto as above described for the first said tank, each tank having a heating coil and means to connect the same with a steam boiler.

2. In an apparatus for the reclamation of oil from hydro-carbon emulsion of the class described, comprising a pair of tanks positioned in working relation to each other as containers for treating chemical and hydro-carbon products, each tank having a steam coil near the bottom thereof and means to connect the same with a source of supply, a conveyor pipe for hydro-carbon emulsion entering one of the tanks near the bottom thereof in close proximity to its respective steam coil, the pipe having an upturned open portion near the diametrical axis of the tank, a legged conical baffle positioned with the apex downward and axial with the opening of the upturned portion, the legs as attaching means for the said conical element to the upturned portion of the said conveyor pipe, another pipe connecting the upper extremity of the tank last referred to and extending downward connecting near the lower extremity of the other tank and extending inward, terminating with an upturned portion near the diametrical axis of the tank and having positioned thereon a similar legged conical baffle, the steam coil in the last said tank being positioned in close proximity below the last said conical baffle, a woven screen baffle and means to secure the same to snug peripheral engagement for the inside wall of the tank first referred to and positioned in close proximity to the conical baffle element as means to retain emulsion from freely passing therethrough and a fluid spray coil positioned in close proximity above and over the said screen baffle as washing means injecting through the screen as liquefying means for hydro-carbon emulsion beneath the screen prior to passing therethrough in liquid form and means to circulate fluid through the coil.

JOHN M. JACKSON.